(12) United States Patent
Prewitt

(10) Patent No.: US 6,209,574 B1
(45) Date of Patent: Apr. 3, 2001

(54) FREON LOCK BOX

(76) Inventor: Todd J. Prewitt, 1475 Sawdust Rd. 3103, The Woodlands, TX (US) 77380

( * ) Notice: Subject to any disclaimer, the term of this patent is extended or adjusted under 35 U.S.C. 154(b) by 0 days.

(21) Appl. No.: 09/564,180

(22) Filed: May 4, 2000

Related U.S. Application Data

(60) Provisional application No. 60/133,806, filed on May 11, 1999.

(51) Int. Cl.⁷ .................................................. F16K 35/00
(52) U.S. Cl. ........................................ 137/382; 137/377
(58) Field of Search .................................. 137/377, 382; 70/178, 232

(56) References Cited

U.S. PATENT DOCUMENTS

| | | | |
|---|---|---|---|
| 961,959 | * | 6/1910 | Herfurth .............................. 137/382 |
| 1,084,996 | * | 6/1914 | Wright ................................. 137/382 |
| 1,690,461 | * | 11/1928 | Sieben ................................. 137/382 |
| 3,963,144 | * | 6/1976 | Berwald .............................. 137/382 |
| 4,301,828 | * | 11/1981 | Martin, Jr. ........................... 137/381 |
| 4,352,370 | * | 10/1982 | Childress ............................. 137/382 |
| 4,630,456 | | 12/1986 | Nielsen, Jr. . |
| 4,777,811 | | 10/1988 | Binkley . |

* cited by examiner

*Primary Examiner*—A. Michael Chambers

(57) ABSTRACT

A lockable box which may be opened, positioned around the gauge ports on the refrigerant lines in an air conditioning system, then closed and locked, thereby preventing unauthorized access to the gauge ports and bleed off of refrigerant from the ports.

3 Claims, 3 Drawing Sheets

FREON LOCK BOX

This APPLN claims benefit of Ser. No. 60/133,806 filed May 11, 1999.

BACKGROUND—FIELD OF THE INVENTION

This invention prevents the unauthorized access to FREON from air from air conditioning units.

BACKGROUND—DESCRIPTION OF PRIOR ART

Air conditioning systems require circulation of a refrigerant to generate the desired cooling effect. Although various refrigerants have been used in the past, and are in use today, the most common refrigerants have been various fluorocarbon compounds, at least some of which have been marketed as and commonly known under the trade name FREON. That material traditionally served as a relatively efficient and inexpensive refrigerant, although in recent years has come under critisim for ozone layer degradation. In a typical refrigeration cycle, the refrigerant is carried through the system in metal lines (which are often copper) either as a gas or a liquid, depending upon which point in the cycle is being considered. In a typical air conditioning system, at least a pair of metal service lines run into the external compressor/fan unit, and there are usually valves or fittings located adjacent the unit to permit service (such as adding FREON in the event of a leak, or bleeding down the lines) to the system.

Yet another problem has arisen in connection with FREON and other refrigerant systems, in the form of unauthorized persons opening valves and/or fittings on the refrigerant lines in order to inhale the escaping refrigerant (exciting the line as a gas). Youths, in particular, have done this on occasion for the "high" they receive from the inhalant. Unfortunately, a number of persons, in particulars teens, have in fact died from the adverse effects of inhaling large quantities of the refrigerant.

A need exists, then, for an apparatus which prevents unauthorized access to valves and/or fittings on the service lines or conduits or refrigeration systems.

SUMMARY OF THE INVENTION

The present invention is a box that covers the gauge ports located on the refrigerant lines of a typical air conditioning system, and locks in place, thereby preventing unauthorized access to the FREON in the air conditioning system.

OBJECTS AND ADVANTAGES

In accordance with the law that requires one to be certified to purchase FREON, it would therefore be prudent to restrict access to FREON or other refrigerants after purchase only by authorized persons. Therefore, it is desirable to have an apparatus which prevents unauthorized access to refrigerants by preventing unauthorized access to mechanical fittings on service lines carrying the refrigerant, via an enclosure or box that locks over such line fittings, in particular the gauge ports, presenting several objects and advantages to the present invention:

(a) the lock box of the present invention is simple to manufacture;

(b) the present invention is affordable;

(c) the present invention is easy to install and open when proper access is required.

Additional objects and advantages include reduced depletion of the Earth's ozone layer, because the atmospheric release of refrigerants is reduced; and perhaps importantly, greatly increased personal safety by preventing persons from inhaling FREON and suffering the damaging and long term effects FREON inhalation has on the human body, particularly the brain.

DRAWING FIGURES

In the drawings, closely related figures have the same number but different alphabetic suffixes.

Figure 1A:
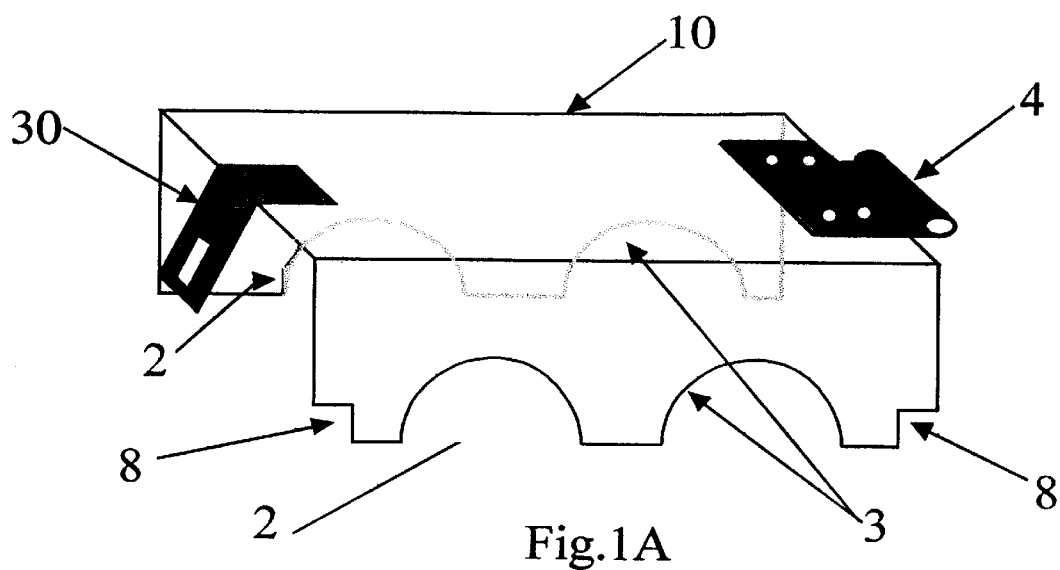
FIG. 1A shows the top half of the lock box which will cover the gauge port and lock together with the bottom half of the box.

REFERENCE NUMERALS IN DRAWINGS 1 lock staple
2 first tubing passage notch
3 second tubing passage notch
4 top slip lock hinge
5 bottom slip lock hinge
8 notches on the top half
10 top half
20 bottom half
30 strap

DESCRIPTION OF THE PREFERRED EMBODIMENT

Figure 1B:
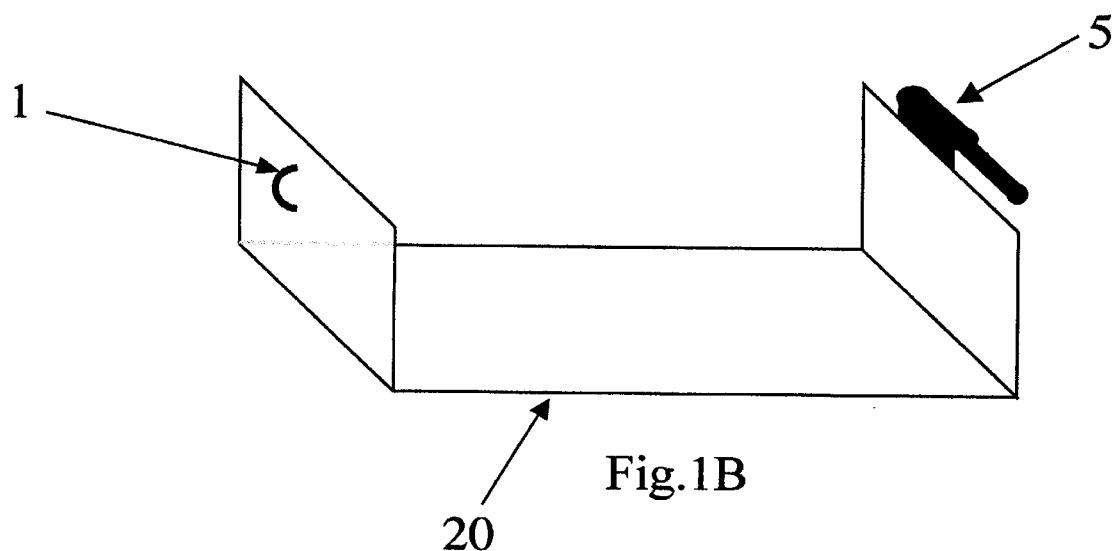
FIG. 1B shows the bottom half of the box.
Figure 2:
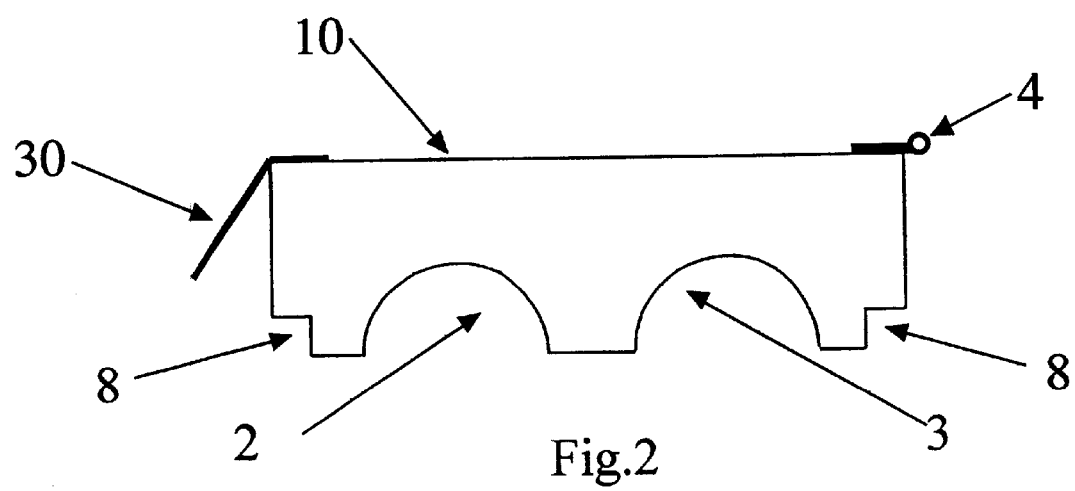
FIG. 2 is a side view of the top half of the box.
Figure 3:
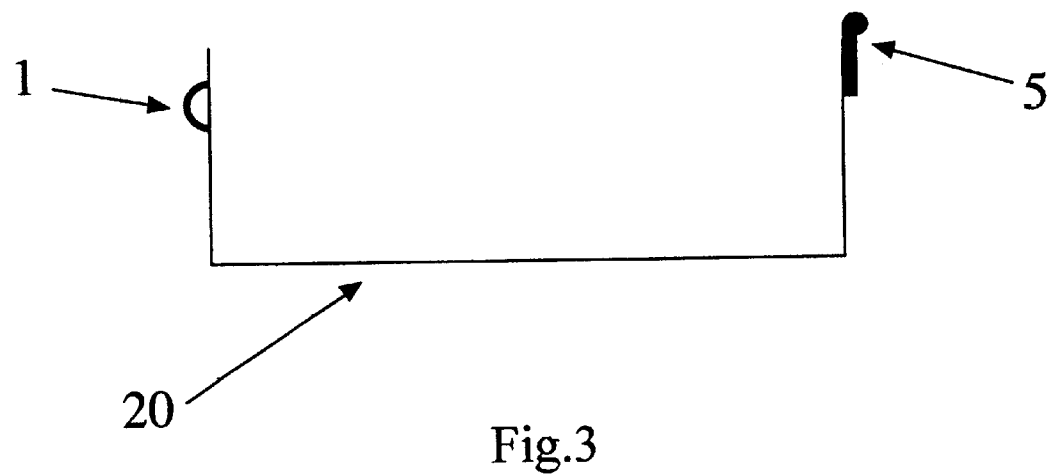
FIG. 3 is a side view of the bottom half of the box.
Figure 4:
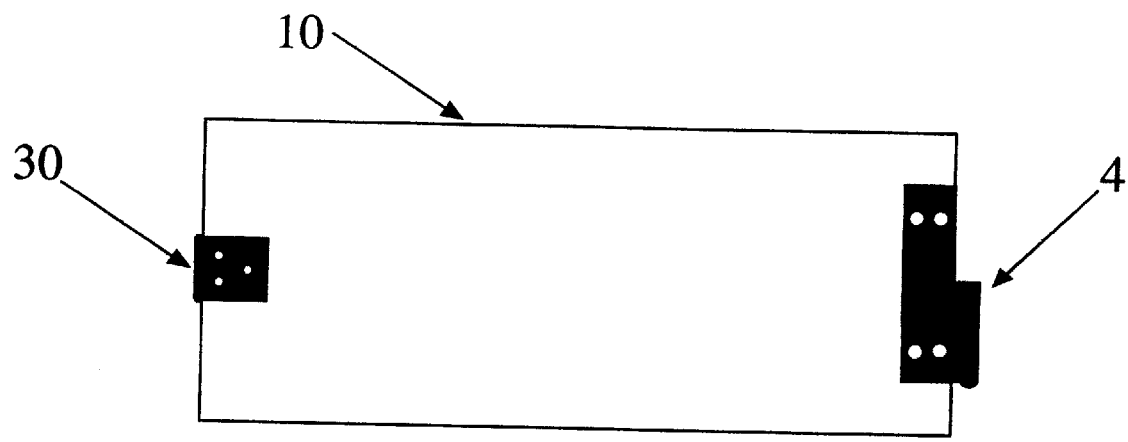
FIG. 4 shows the top view of the box.
Figure 5:
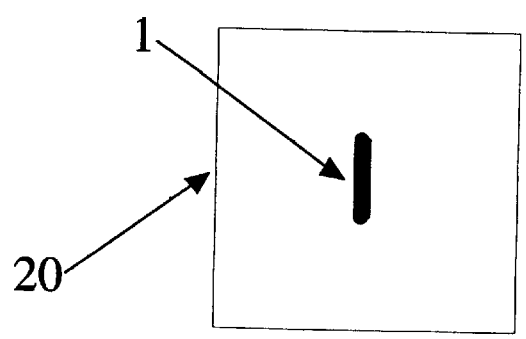
FIG. 5 is the left side view.
Figure 6:
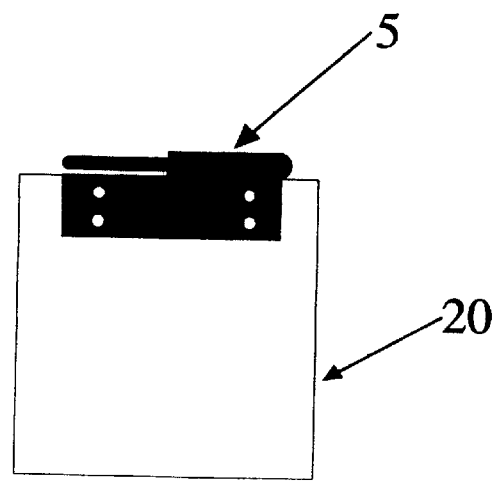
FIG. 6 is the right side view.

A preferred embodiment of the cover of the lock box of the present invention is illustrated in FIG. 1A, showing top half 10, and FIG. 1B, showing bottom half 20. Top half 10 has a top and two sides, and has a first notch 2 cut in both sides to allow one refrigerant line, on which are disposed gauge ports, to go through. Top half 10 has a second notch 3, in the preferred embodiment, to allow passage of a second refrigerant line, on which also are disposed gauge ports. It is understood that a lesser or greater number and size of service lines used in a particular refrigeration or air conditioning system.

Bottom half 20 has a bottom and front and rear sides. The rear side comprises bottom slip lock hinge 5. The bottom section of bottom half 20 is substantially flat or planar, in order to more readily be positioned underneath service lines which may have very little clearance above the ground, concrete or other mounting surface for the air conditioning unit Top half 10 and bottom half 20 of the lock box are removably joined by a hinge comprising slip lock hinge 4, fixed to the rear side of top half 10, which engage hinge 5. The hinge thus formed permits the lock box to be opened and closed, as described in more detail below. Top half further comprises strap 30 which is rotatable connected thereto, and has a cutout therein. Bottom half comprises a semi-circular lock staple 1. When the lock box is closed, strap 30 is rotated so that the cutout in strap 30 fits over lock staple 1, locking top half 10 and bottom half 20 together. Also top half 10 having two notches 8 on one side of the top half 10 to allow clearance when the top half 10 and bottom half 20 are in the closed position.

The present invention may be made in particular shapes and sizes as necessary to adapt to particular air conditioning installations. While for most installations it is preferable for the bottom section of bottom half 20 to be essentially "flat" to ease its placement underneath service lines, the overall shape of the lock box may vary, from cubic shapes to more rounded or tapered shapes. Sizes are as appropriate to enclose gauge ports and line sizes. The number of notches may be varied to suit the number of lines. Different arrangements of hinges and locks may be used.

In addition, the lock box may be made of a variety of materials. Sheet metal is well suited to be used due to its strength and relatively low cost and ease of use. However, other materials such as plastics and other components may also be used.

Operation—FIGS. 1A and 1B

Use of the lock box of the present invention is simple. A typical sequence of use would be to first slide bottom half 20 under the service line at the location of the gauge ports. Next, the slip lock hinge 4 is inserted into slip lock hinge 5, thereby forming a hinge and linking top half 10 and bottom half 20. The lock box thus formed may be closed, strap 30 rotated so as to fit around lock staple 1 and a suitable lock (which may be a combination lock, a key lock, or other locks well known in the art) fit through lock staple 1, thereby locking together top half 10 and bottom half 20, fully enclosing the gauge ports and preventing access to the gauge ports.

Conclusion

Accordingly, the reader will see that the FREON lock box has several advantages; for instance, preventing anyone from inhaling or accessing FREON, due to the damaging effects it has on the human brain as well as the environment. The lock box of the present invention would be affordable and quite easy to manufacture. It seems as if there should be a law that all air conditioner units have a box installed thereon, because one must be certified to gain access to FREON by by legally purchasing same, however anyone can access it at the gauge ports of their backyard air conditioner unit.

Although the description above contains many specificities, these should not be constructed as limiting the scope of the invention but as merely providing illustrations of some of the presently preferred embodiments of this invention. For example, different sizes, shapes, and materials may be used to fabricate the invention.

Accordingly, the scope of the invention should be determined by the appended claims and their legal equivalents, rather than by the examples given.

I claim:

1. An apparatus for preventing unauthorized access to refrigeration system line fittings, comprising:

a) a top half, said top half comprising a top and sides, said sides comprising at at least one notch therein, said top half further comprising at least on hinge protruding from a rear edge of said top, and a strap rotatable fixed to a front edge of said top and having a cutout therein;

b) a bottom half having a bottom section, a front and a back, said back comprising at least one hinge adapted to receive said at least one hinge, said front comprising a protruding lock staple adapted to fit through said cutout in said strap, said bottom section of said bottom half being substantially flat, and c) a lock adapted to be placed through said lock staple, whereby when said apparatus is placed so that said at least one hinge engages said at least one hinge and said top half and said bottom half are then closed around line fittings of an air conditioning unit and said lock placed through said lock staple, said fittings are protected from unauthorized access.

2. The apparatus of claim 1, whereby said at least one notch comprises two notches.

3. The apparatus of claim 2, wherein said apparatus is formed from sheet metal.

\* \* \* \* \*